United States Patent
Tseng et al.

(10) Patent No.: US 7,245,608 B2
(45) Date of Patent: Jul. 17, 2007

(54) CODEC AWARE ADAPTIVE PLAYOUT METHOD AND PLAYOUT DEVICE

(75) Inventors: Kuo-Kun Tseng, Hsin-Chu (TW); Ying-Dar Lin, Hsin-Chu (TW)

(73) Assignee: Accton Technology Corporation, Hsin-Chu (TW)

( * ) Notice: Subject to any disclaimer, the term of this patent is extended or adjusted under 35 U.S.C. 154(b) by 884 days.

(21) Appl. No.: 10/065,172

(22) Filed: Sep. 24, 2002

(65) Prior Publication Data

US 2004/0057381 A1   Mar. 25, 2004

(51) Int. Cl.
*H04J 12/66* (2006.01)
*H04J 3/06* (2006.01)

(52) U.S. Cl. ...................... 370/352; 370/517
(58) Field of Classification Search ............... 370/238, 370/465
See application file for complete search history.

(56) References Cited

U.S. PATENT DOCUMENTS

| | | | |
|---|---|---|---|
| 5,600,632 A | | 2/1997 | Schulman |
| 5,815,634 A | | 9/1998 | Daum et al. |
| 6,072,809 A | | 6/2000 | Agrawal et al. |
| 6,259,677 B1 | | 7/2001 | Jain |
| 6,490,552 B1 | * | 12/2002 | Lee et al. ................ 704/209 |
| 6,609,092 B1 | * | 8/2003 | Ghitza et al. .............. 704/226 |
| 6,862,298 B1 | * | 3/2005 | Smith et al. ............... 370/516 |
| 7,085,230 B2 | * | 8/2006 | Hardy ...................... 370/232 |
| 2002/0167936 A1 | * | 11/2002 | Goodman ................ 370/352 |
| 2004/0165570 A1 | * | 8/2004 | Lee ......................... 370/349 |

OTHER PUBLICATIONS

Kuo-Kun Tseng, Yuan-Cheng Lai and Ying-Dar Lin, Perceptual codec and interaction aware playout algorithms and quality measurement for VoIP systems, Consumer electronics, IEEE transactions on vol. 50, issue 1, Feb. 2004, pp. 297-305.*

Miroslaw Narbutt, Mark Davis, An assessment of the audio codec performance in voice over WLAN (VoWLAN) systems, Mobile and Ubiquitous systems: Networking and services, 2005. MobiQuitous 2005. The second annual international conference on Jul. 17-21, 2005, pp. 461-467.*

ITU-T Recommendation p. 830 Subjective performance assessment of telephone-band and wideband digital codecs (Feb. 1996).*

(Continued)

*Primary Examiner*—Chau Nguyen
*Assistant Examiner*—Leibo Ding
(74) *Attorney, Agent, or Firm*—Winston Hsu

(57) ABSTRACT

A codec aware adaptive playout method estimates playout delays for a current packet based on a loss mean opinion score (LMOS), a delay mean opinion score (DMOS), and a mean mean opinion score (MMOS) of packets with reference to the codec used in voice over Internet protocol (VoIP), streaming audio, and streaming video transmissions. The method selects an estimated playout delay having an optimum MMOS, or playout quality, from the plurality of estimated playout delays, and delays the playout of the current packet by the selected estimated playout delay. A codec aware adaptive playout device includes a playout controller for controlling playout of packets in a playout buffer. The playout controller references network delay estimates provided by a network delay estimator, and codec information such as the LMOS, DMOS, and MMOS provided by a codec detector to determine playout delays for the packets of the playout buffer.

14 Claims, 3 Drawing Sheets

OTHER PUBLICATIONS

R. Ramjee, J. Kurose, D. Towsley, and H. Schulzrinne, "Adaptive Playout Mechanisms for packetized Audio Applications in Wide-Area Networks", Proceedings of IEEE Infocom, Toronto, Canada, pp. 680-686, Jun. 1994.

Marco Roccetti, Vittorio Ghini, Giovanni Pau, Paola Salomoni, and Maria Elena Bonfigli, "Design and Experimental Evaluation of an Adaptive Playout Delay Control Mechanism for Packetized Audio for use over the Internet", Nov. 1998.

H. Schulzrinne, S. Casner, R. Frederick, V. Jacobson, "RTP: A Transport Protocol for Real-Time Applications". RFC 1889, Jan. 1996.

Jesus Pinto and Kenneth J. Christensen, "An Algorithm for Playout of Packet Voice based on Adaptive Adjustment of Talkspurt Science Periods".

Phillip DeLeon and Cormac J. Sreenan, "An Adaptive Predictor for Media Playout buffering", Stanford, Mar. 2001.

* cited by examiner

CODEC AWARE ADAPTIVE PLAYOUT METHOD AND PLAYOUT DEVICE

BACKGROUND OF INVENTION

1. Field of the Invention

The present invention relates to network data transmission, and more specifically, to optimizing a playout delay for packets transmitted in a network, said packets comprising data for playout in a stream and compressed according to a codec (compressor/decompressor).

2. Description of the Prior Art

The popularity of the Internet has led to the development of technologies that allow real-time streaming of voice, audio, and video transmissions. Nearly everyone who has used the Internet has at one time or another listened to streaming audio or watched streaming video. More recently, other methods of communication through the Internet have been developed such as voice over Internet protocol (VoIP). Using software that implements VoIP is becoming a popular and economical way for people to communicate with each other through the Internet and other computer networks.

One of the major obstacles in the communication of packets belonging to a streaming transmission, such as VoIP packets, is variance in network delay known as jitter. Jitter is typically reduced by delaying the playout of packets according to a playout delay. As network delay is not constant, reducing the amount of jitter in a transmission requires reasonable measurements of network delay and accurate estimations of playout delay. However, the playout delay cannot be too long, as the transmission is intended to be real-time streaming and long playout delays defeat this intention.

FIG. 1 is a schematic diagram that shows packets of data of a voice data 20 being sent across a network 10. The data 20 includes audible ranges 20a, 20c, and 20e where there is discernable audio information and silent ranges 20b and 20d where there is an absence of discernable audio information. A sender 12, being a PC or other device, sends packets P1–P15 in order at regular intervals, but because of network delay delaying the transmission of the packets P1–P15, some of the packets P1–P15 arriving at a receiver 14, a similar PC or device, must be further delayed by different amounts to form a cohesive voice data 22. The voice data 22 includes audible ranges 22a, 22c, and 22e and silent ranges 22b and 22d corresponding to the ranges 20a–20e of the sent data 20.

The packet P1 is sent by the sender 12 at a given time. The packet P1 is delayed by the network 10 for any number of reasons, said delay and further delays being indicated in FIG. 1 by a shaded block having a label "D". The packet P1 is further delayed by the receiver 14 so it can be played contiguously with the packet P2 that is also delayed by the network 10. If the packet P1 is not further delayed by the receiver 14, packets P1 and P2 would not be played contiguously, and an audible break in the data 22 would occur. The audible break in the data 22 would be heard by a listener at the receiver 14, which translates to poor audio quality of the playout data 22.

The packets P2–P5 are all delayed by the network 10 by the same amount of time and do not have to be further delayed by the receiver 14 to be played in sequence with proper timing. However, the packet P7 arrives before the packet P6. The receiver 14 must delay the playout of the packet P7 until the packet P6 is received. This delay is added to the silent range 22b of the data 22 so that the audible range 22c is not affected. The packets P8 and P9 arrive simultaneously as do the packets P10 and P11 because of network delay and packet bursting. Playout of the packets P9 and P11 is accordingly delayed, however, no further delay of the data 22 results. The packets P13 and P14 suffer a similar disorder as the packets P6 and P7. The packets P12 and P15 arrive at the receiver 14 normally.

The above description with reference to FIG. 1 is a simplification. The packets P1–P15 were assumed to arrive at the receiver delayed by an integer multiple of their packet length. In reality, a substantially large number of packets in a given transmission must be delayed, as network delay and jitter are essentially continuous in time and packet length is digital.

FIG. 1 shows that the entire received data 22 is delayed by three blocks by a combination of network delay and additional playout delay added by the receiver 14. If this additional delay were not added by the receiver 14, some packets would be played out of order and others would not be played at all. The prior art teaches a number of ways to estimate the delay required to be added by the receiver 14.

A fundamental and arguably most useful method of estimating playout delay is the mean delay and variance (MDV) method described in R. Ramjee, J. Kurose, D. Towsley, and H. Schulzrinne, "Adaptive Playout Mechanisms for Packetized Audio Applications in Wide-Area Networks", Proceedings of IEEE INFOCOM, Toronto, Canada, pp. 680–686, June 1994, which is incorporated herein by reference. The MDV method is further described in Marco Roccetti, Vittorio Ghini, Giovanni Pau, Paola Salomoni, and Maria Elena Bonfigli, "Design and Experimental Evaluation of an Adaptive Playout Delay Control Mechanism for Packetized Audio for use over the Internet", November 1998, which is also incorporated herein by reference. Briefly, the MDV method estimates playout delay from a variance of a mean network delay in conjunction with a smoothing factor. This simple adaptive approach offers significant improvement over other non-adaptive approaches.

Another method of estimating playout delay is described in the real-time transport protocol (RTP) standard. H. Schulzrinne, S. Casner, R. Frederick, V. Jacobson, "RTP: A Transport Protocol for Real-Time Applications", RFC 1889, January 1996 details the RTP standard and is incorporated herein by reference. The RTP method of estimating delay is essentially the MDV method applied with a fixed smoothing factor. While simpler than the MDV method, the RTP method offers a less accurate estimation of network delay.

Other prior art methods of estimating playout delay include a spike detection method described in "Adaptive Playout Mechanisms for Packetized Audio Applications in Wide-Area Networks", and a related gap-based method described in Jesus Pinto and Kenneth J. Christensen, "An Algorithm for Playout of Packet Voice based on Adaptive Adjustment of Talkspurt Silence Periods", 1999, http://citeseer.nj.nec.com/pinto99algorithm.html, which is incorporated herein by reference. Both the spike detection method and the gap-based method offer little significant improvement over the MDV method at the expense of added complexity.

Finally, the prior art offers a normalized least mean square (NLMS) method that is described in Phillip DeLeon and Cormac J. Sreenan, "An Adaptive Predictor for Media Playout buffering", Stanford, March, 2001, http://citeseer.nj.nec.com/deleon99adaptive.html, which is incorporated herein by reference. The NLMS is a complicated method that offers no readily apparent advantages over other methods.

In addition, the prior art has numerous patents relating to the playout of digital information and performance monitoring of the playout. For instance, Daum et al. teach stream synchronization for MPEG playback in the comprehensive U.S. Pat. No. 5,815,634, and Jain describes a real-time receiver and method for receiving and playing out real-time packetized data in U.S. Pat. No. 6,259,677, both of which are included herein by reference. Additionally, Schulman in U.S. Pat. No. 5,600,632 teaches performance monitoring in a network using synchronized network analyzers relating to packet delay, and Agrawal et al. provide a predictive approach to synchronization using a method for maintaining and updating statistical trends of network delay in U.S. Pat. No. 6,072,809, both of which are include herein by reference.

The prior art methods mentioned and described above share a common characteristic, that is, they optimize the playout delay from network statistics only. The prior art methods do not adequately consider the codec used in compressing data for playout and resulting actual playout quality.

SUMMARY OF INVENTION

It is therefore a primary objective of the claimed invention to provide a codec aware adaptive method for optimizing a playout delay of packets being transmitted within a network to solve the problems of the prior art.

Briefly summarized, the claimed invention method estimates playout delays for a current packet based on a loss mean opinion score (LMOS), a delay mean opinion score (DMOS), and a mean mean opinion score (MMOS) of packets with reference to the codec. The claimed invention method selects an estimated playout delay having a maximum MMOS from the plurality of estimated playout delays, and delays the playout of the current packet by the selected estimated playout delay.

According to the claimed invention, a playout device for playing packets with an optimized delay through a media output device includes a playout buffer, a playout controller, a network delay estimator, and a codec detector. The playout buffer buffers packets received from a receiver. The playout controller determines estimated playout delays of the packets from estimated network delays and codec information for controlling the playout buffer according to selected playout delays. The network delay estimator calculates estimated network delays of the packets and sends a plurality of estimated network delays to the playout controller. The codec detector detects the codec to which the packets are compressed and sends codec information to the playout controller. The playout controller controls the playout buffer according to the selected playout delay for each packet.

It is an advantage of the claimed invention that the playout is delayed according to the LMOS, DMOS, and MMOS. The LMOS, DMOS, and MMOS, being based on the codec, provide an accurate estimation of playout quality and facilitate the selection of a playout delay that maximizes the playout quality while minimizing additional playout delay.

It is a further advantage of the claimed invention that the playout delay is selected from a plurality of estimated playout delays based on a comparison of MMOS values for each estimated playout delay, thus maximizing the playout quality.

These and other objectives of the claimed invention will no doubt become obvious to those of ordinary skill in the art after reading the following detailed description of the preferred embodiment that is illustrated in the various figures and drawings.

DETAILED DESCRIPTION

The present invention codec aware adaptive playout method is best understood when described in conjunction with a playout device. Notation is consistent between all equations and procedures given.

Figure 1:
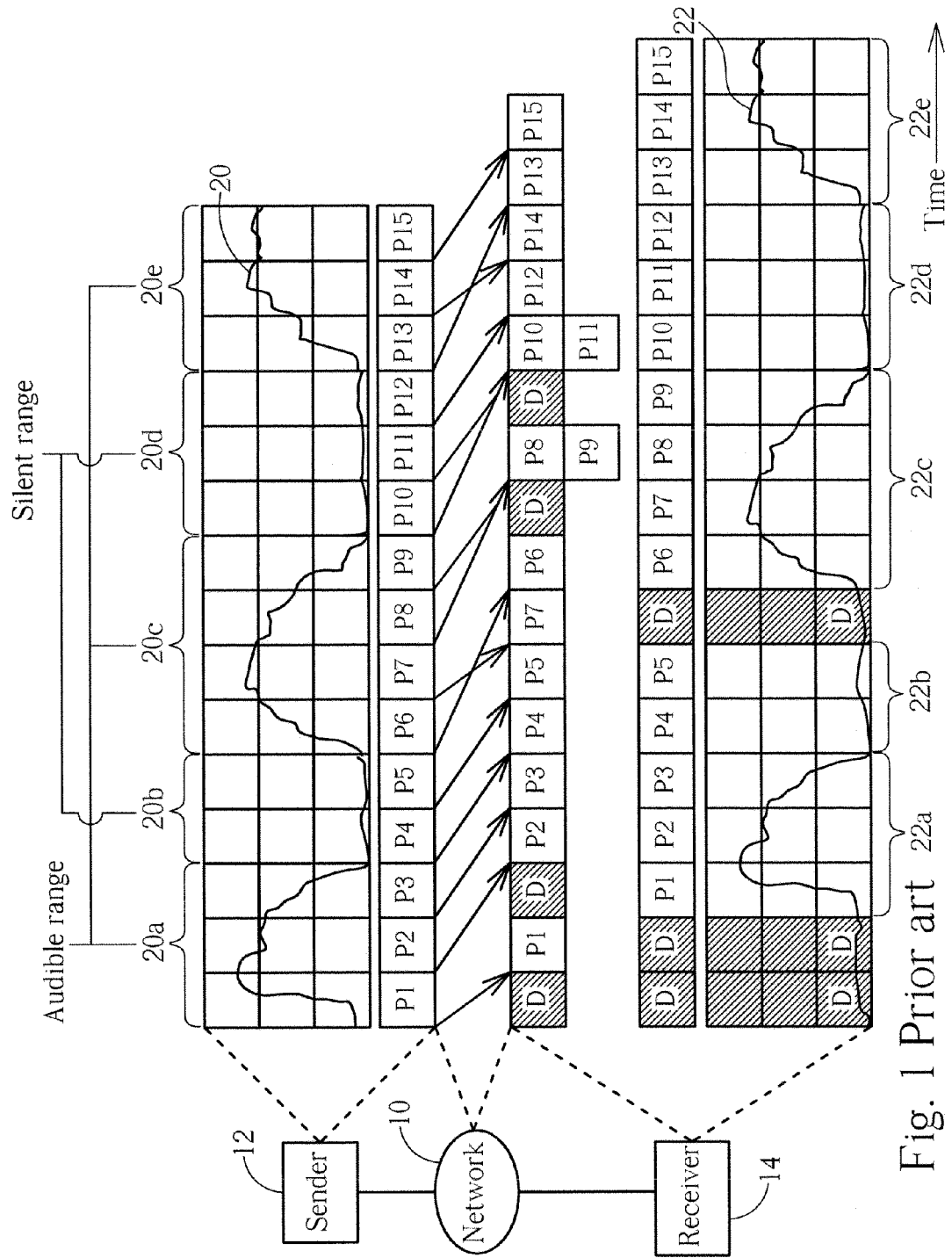
FIG. 1 is a schematic diagram showing packets of a voice data being sent across a network.
Figure 2:
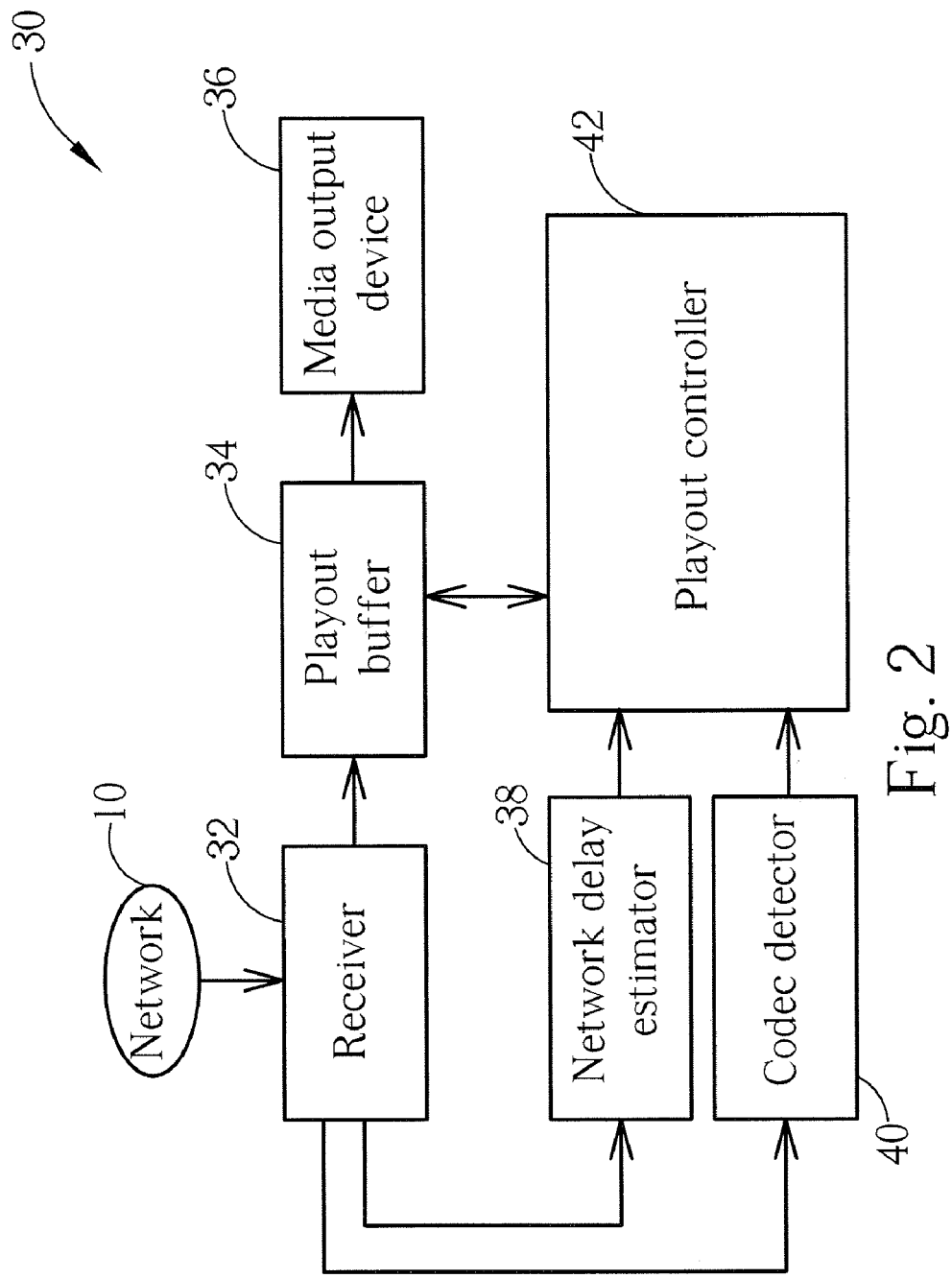
FIG. 2 is a block diagram of a playout device according to the present invention.

Please refer to FIG. 2. FIG. 2 shows system architecture of a playout device 30 according to the present invention. The playout device 30 comprises a receiver 32 for receiving packets from the network 10, and a playout buffer 34 for receiving packets forwarded by the receiver 32 and for outputting data of the packets to a media output device 36. The playout buffer 34 is used to absorb network delay so playout of the packets at the media output device 36 is substantially smooth and continuous. The media output device 36 can be a typical media output device such as a voice over Internet protocol (VoIP) player, a streaming audio player, or a streaming video player. The playout device 30 further comprises a network delay estimator 38 for estimating network delay of the network 10, a codec detector 40 for detecting a codec to which the packets are compressed, and a playout controller 42 for controlling the playout buffer 34. The playout controller 42 sets the delays of packets in the playout buffer 34 according to network delay estimates from the network delay estimator 38 and codec information from the codec detector 40. When the playout delay of a packet expires, the playout buffer 34 sends the packet to the media output device 36 for playout.

The network delay estimator 38 and playout controller 42 estimate network delay and mean network delay variance according to the following equations:

$$D_i = |(R_i - R_{i-1}) - (S_i - S_{i-1})|$$

$$MD_i = F \times MD_{i-1} + (1-F) \times D_1$$

$$V_i = |MD_i - D_i|$$

$$MV_i = F \times MV_{i-1} + (1-F) \times V_i \qquad \text{(Eqns. 1)}$$

where,
D is network delay;
R is a receiver timestamp;
S is a sender timestamp;
i is an index that denotes a current packet;
i−1 is an index that denotes a previous packet;
MD is mean network delay;
F is a smoothing factor;
V is network delay variance or jitter;
MV is mean network delay variance;

Essentially, the network delay estimator 38 first estimates a network delay for the current packet based on network statistics of the current packet and of the previous packet. The network delay estimator 38 then forwards the estimated network delay for the current packet to the playout controller 42. The playout controller 42 then calculates a mean network delay variance for the current packet using the mean network delay, the smoothing factor, and the network delay variance. The playout controller 42 then calculates estimated playout delays for packets according to the following equations:

$$EPD_{pre} = PD_{i-1}$$
$$EPD_{inc} = PD_{i-1} + U_a$$
$$EPD_{dec} = PD_{i-1} - U_b$$
$$EPD_{sta} = MV_i \times SF \times \frac{LMOS_{i-1}}{MMOS_{i-1}}$$

(Eqns. 2)

where,

EPD are estimated playout delays, and $EPD_{pre}$ is a playout delay of the previous packet, $EPD_{inc}$ is the playout delay of the previous packet increased by a step size, $EPD_{dec}$ is the playout delay of the previous packet decreased by a step size, and $EPD_{sta}$ is a playout delay calculated based on codec information;

PD is a playout delay;

$U_a$ and $U_b$ are step sizes;

SF is a playout scaling factor;

LMOS is a packet loss rate mean opinion score;

MMOS is mean mean opinion score;

The playout controller 42 calculates a plurality of estimated playout delays EPD, of which one will be selected to delay playout of the current packet. The estimated playout delays $EPD_{pre}$, $EPD_{inc}$, and $EPD_{dec}$ are simply determined based on the actual playout delay of the previous packet and are respectively the same as the previous packet, increased by a step size, or decreased by a step size. Additional, similar methods could be used to determine more estimated playout delays so that Eqns.2 comprised any number of formulas. On the other hand, the determination of $EPD_{sta}$ includes reference to codec specific information LMOS and MMOS.

Given corresponding packet loss rates and delays the codec specific LMOS and a codec specific delay mean opinion score (DMOS) can be determined. The MMOS for the previous packet is then simply an arithmetic mean of the LMOS and DMOS. Typically, the codec itself determines the LMOS, DMOS, and MMOS, as this information is specific to the codec. For instance, some codecs are more sensitive to packet loss than others are. Similarly, some codecs are more sensitive to packet delay. The difference in the mechanics of each codec, and how it compresses data, is fundamental to the sensitivity of the codec to packet loss and packet delay. Nevertheless, LMOS, DMOS, and MMOS values can be extracted from any given codec referencing packet loss rates and delays. Furthermore, the MMOS is a good overall objective measure of playout quality.

The estimated playout delay $EPD_{sta}$ is calculated by the playout controller 42 as shown in Eqns.2 using the ratio of LMOS to MMOS for the previous packet.

Alternatively, other ratios of LMOS, DMOS, and MMOS could be used instead, however, these do not typically improve the playout quality over the ratio of LMOS to MMOS. Qualitatively, the estimated playout delay $EPD_{sta}$ for the current packet is high when the packet loss rate mean opinion score LMOS is high and the delay mean opinion score DMOS is low. In other words, when packet loss is high, an increase in playout delay is warranted with the aim of reducing packet loss. Similarly, the estimated playout delay $EPD_{sta}$ for the current packet is low when the LMOS is low and the DMOS is high. In other words, when packet loss is low, a decrease in playout delay is desired with the aim of reducing playout delay. In this way, the playout controller 42 determines the estimated playout delay $EPD_{sta}$ to maximize playout quality as measured by MMOS.

To determine which estimated playout delay calculated in Eqns.2 is most suitable for playout of the current packet, the playout controlled 42 must compare the MMOS of each estimated playout delay. To facilitate this, for each estimated playout delay, a total delay is calculated by the playout controller 42 as follows:

$$TD_{i,j} = CD + D_i + EPD_{i,j} \qquad (Eqn.3)$$

where,

TD is the total delay;

j is an index of an estimated playout delay (EPD);

CD is a codec delay;

The playout controller 42 calculates a plurality of total delays for the current packet, or one total delay for each estimated playout delay $EPD_{pre}$, $EPD_{inc}$, $EPD_{dec}$, and $EPD_{sta}$ as determined in Eqns.2. Each total delay comprises a codec delay that represents time required for the codec to compress and decompress packet data, the network delay for the current packet from Eqns.1, and the estimated playout delay under consideration.

The playout controller 42 also determines a moving average packet loss rate for each estimated playout delay determined in Eqns.2 according to the following procedure:

IF $EPD_{i,j} < V_i$
   $PLC_{i,j} = 1$
ELSE
   $PLC_{i,j} = 0$ $$PLR_{i,j} = L \times PLR_{i-1,j} + (1-L) \times PLC_{i,j} \qquad (Eqns.4)$$

where,

PLC is a packet loss counter;

PLR is the packet loss rate;

L is a loss smoothing factor;

When the estimated playout delay under consideration is less than the network delay variance of the current packet, the packet loss counter is set to a value of 1, otherwise the packet loss counter is set to 0. Then, the playout controller 42 calculates the packet loss rate for the particular estimated playout delay referencing a packet loss rate of the previous packet.

Once the playout controller 42 has determined both the total delay from Eqn.3 and the packet loss rate from Eqns.4 for the current packet for each of the estimated playout delays of Eqns.2, the playout controller 42, referencing the codec, then determines the MMOS of each estimated playout delay for the current packet. The playout controller 42 then compares each MMOS and selects an MMOS with the highest value, and further sets the playout delay of the current packet to the estimated playout delay corresponding to the MMOS with the highest value. This is summarized by the following:

$$MMOS_{i,j} = MMOS(TD_{i,j}, PLR_{i,j})$$

$$PD_i = OPT\_MOS(MMOS_{i,j}, EPD_{i,j}) \qquad (Eqns.5)$$

where,

MMOS( ) is a function that returns an MMOS based on the total delay and packet loss rate, and is codec dependent as previously described. Typically, the codec detector 40 will be able to supply the playout controller 42 with the relevant codec information so that the playout controller 42 can perform this function;

OPT_MOS( ) is a function that returns the estimated playout delay that corresponds to the maximum MMOS;

PD$_i$ is the playout delay of the current packet;

The playout controller 42 thus effectively determines which estimated playout delay gives the best MMOS measure of playout quality and sets the playout delay of the current packet to this value.

In practical application, the playout device 30 and its constituent components can be realized using conventional electronic circuits, integrated circuits, and related software programs. The logic and programming of the playout controller 42 and the network delay estimator 38, as well as that of the other components of the playout device 30 can be fine—tuned and designed to suit any relevant media playout application. Such applications include VoIP players, streaming audio players, and streaming video players for use with the Internet and wireless telephone communications systems.

Figure 3:
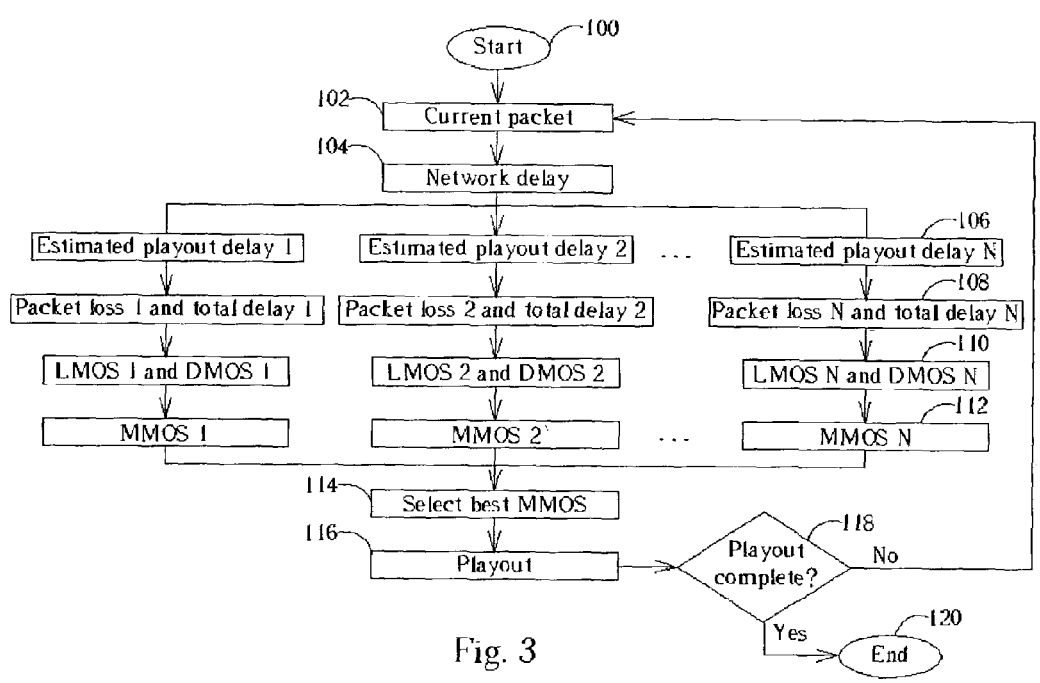
FIG. 3 is a flowchart of packet playout according to the present invention.

The previously described process for optimizing a playout delay of packets performed by the playout device 30 can be summarized with reference to the flowchart of FIG. 3 that is described as follows:

Step 100: Start media playout;

Step 102:

The receiver 32 continually receives packets to be played by the media output device 36 and forwards these packets to the playout buffer 34. The playout controller 42 identifies one of these packets as the current packet to be played, and another as the previous packet just played based on a sequential playing methodology;

Step 104:

The network delay estimator 38 estimates network delay. The playout controller 42 further calculates the mean network delay variance. Procedures in accordance with the Eqns.1 are performed;

Step 106:

The playout controller 42 calculates the plurality of N estimated playout delays for the current packet. Procedures in accordance with the Eqns.2 are performed;

Step 108:

The playout controller 42 calculates the packet loss rate and the total delay for each of the N estimated playout delays by performing procedures in accordance with Eqn.3 and Eqns.4;

Step 110:

For each of the N estimated playout delays, the playout controller 42 references the codec information provided by the codec detector 40 to determine the LMOS and the DMOS of the current packet. The LMOS and the DMOS of the current packet are required to calculate the estimated playout delay EPD$_{sta}$ of Eqns.2 for the current packet for use in a next execution of this procedure when processing a next packet;

Step 112:

The playout controller 42 calculates the MMOS of the current packet for each of the N estimated playout delays using procedures referencing Eqns.5. Alternatively, each MMOS can be calculated as an arithmetic mean of the LMOS and the DMOS of the current packet;

Step 114:

The playout controller 42 directly compares the plurality of N MMOSs to determine which estimated playout delay out of the plurality of N is most suitable. The estimated playout delay corresponding to the highest MMOS is selected as the playout delay for the current packet by the playout controller 42;

Step 116:

The playout controller 42 controls the playout buffer 34 to wait the selected playout delay and then forward the current packet to the media output device 36 for playout;

Step 118:

The playout controller 42 and playout buffer 34 determine if playout is complete or if there are more packets to be played. Is playout complete? If playout is complete, proceed to step 120. If playout is incomplete, return to step 102;

Step 120: End. Media playout is finished.

In practical application, the above procedure is performed continuously and in near real-time for a large number of packets of a media output stream.

Note that the components of the playout device 30 perform the steps of the procedure as recited above as an example that harmonizes the above procedure with the previously described playout device. However, according to the present invention, the above procedure can be performed by numerous variations of these components and other components and should not be construed as limited by this example.

Generally, parameters such as the smoothing factor F, the step sizes $U_a$ and $U_b$, the playout scaling factor SF, and the loss smoothing factor L can be set to maximize MMOS values and associated playout quality. Furthermore, these parameters can preset for various codecs and further user-customizable.

In contrast to the prior art, the present invention uses codec information of packets, such as LMOS, DMOS, and MMOS, in conjunction with network delay statistics, such as network delay and jitter, to select a most suitable playout delay for a current packet from a plurality of estimated playout delays. Playout according to the present invention is of higher quality than the prior art while minimizing additional and unnecessary playout delay.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for optimizing a playout delay of packets being transmitted within a network, said packets comprising data for playout in a stream and compressed according to a codec, said network having a network delay of packet transmission, the method comprising:

(a) determining a loss mean opinion score (LMOS) and a delay mean opinion score (DMOS) of a previous packet according to the codec;

(b) calculating an estimated playout delay for a current packet based on the LMOS of the previous packet and the DMOS of the previous packet;

(c) calculating a plurality of other estimated playout delays for the current packet;

(d) calculating a mean mean opinion score (MMOS) of each estimated playout delay of the plurality of estimated playout delays;

(e) selecting an estimated playout delay having a maximum MMOS from the plurality of estimated playout delays; and (f) delaying playout of the current packet by the selected estimated playout delay.

2. The method of claim 1 further comprising:

(g) calculating a mean network delay variance of the current packet;

(h) determining a playout scaling factor; and wherein in (b) the estimated playout delay is calculated further based on the mean network delay variance of the current packet and the playout scaling factor.

3. The method of claim 1 wherein the plurality of other estimated playout delays calculated in (c) comprises:
 a playout delay of the previous packet;
 a playout delay of the previous packet increased by a step size; and
 a playout delay of the previous packet decreased by a step size.

4. The method of claim 1 wherein the calculated MMOS depends on a codec delay, the network delay, the estimated playout delay, and a packet loss rate.

5. The method of claim 4 wherein the MMOS is a measure of playout quality, and a high MMOS corresponds to a high playout quality.

6. The method of claim 1 wherein the packets contain audio or video information.

7. The method of claim 1 wherein the playout of the packets is for a voice over Internet protocol (VoIP), streaming audio, or streaming video application.

8. The method of claim 1 wherein the network is a computer network or a radio transmission network for wireless phones.

9. A playout device for playing data contained in packets with an optimized delay, said packets being transmitted within a network and comprising data for playout in a stream and compressed according to a codec, said network having a network delay of packet transmission, the playout device comprising:
 a playout buffer for receiving and buffering packets;
 a playout controller for determining estimated playout delays of packets from estimated network delays and codec information, and for controlling the playout buffer according to selected playout delays;
 a network delay estimator for calculating estimated network delays of packets and sending estimated network delays to the playout controller; and
 a codec detector for detecting the codec to which the packets are compressed and sending codec information to the playout controller for determining a loss mean opinion score (LMOS), a delay mean opinion score (DMOS), and a mean mean opinion score (MMOS) for packets;
 wherein the playout controller selects a playout delay for a current packet having a maximum MMOS from a plurality of estimated playout delays that comprises a playout delay of a previous packet; a playout delay of the previous packet increased by a step size; a playout delay of the previous packet decreased by a step size; and a playout delay based on the LMOS of the previous packet, a mean network delay variance of the current packet and a playout scaling factor.

10. The playout device of claim 9 further comprising:
 a receiver through which the playout buffer receives packets from the network; and
 a media output device to which the playout buffer outputs packets.

11. The playout device of claim 9 wherein the playout delay is based on the LMOS of the previous packet, a mean network delay variance of the current packet and a playout scaling factor further depends on the MMOS of the previous packet.

12. The playout device of claim 9 wherein the playout controller determines the MMOS of the current packet for each of the estimated playout delays referencing a codec delay, the network delay, the estimated playout delay, and a packet loss rate.

13. The playout device of claim 9 wherein the network is a computer network or a radio transmission network for wireless phones.

14. The playout device of claim 10 wherein the media output device is a voice over Internet protocol (VoIP) player, a streaming audio player, or a streaming video player.

* * * * *